United States Patent
Hwang et al.

(10) Patent No.: US 10,382,264 B2
(45) Date of Patent: Aug. 13, 2019

(54) FOG COMPUTING FOR MACHINE TRANSLATION

(71) Applicant: International Business Machines Corporation, Armonk, NY (US)

(72) Inventors: Inseok Hwang, Austin, TX (US); Su Liu, Austin, TX (US); Eric J. Rozner, Austin, TX (US); Chin Ngai Sze, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 134 days.

(21) Appl. No.: 15/379,541

(22) Filed: Dec. 15, 2016

(65) Prior Publication Data

US 2018/0176317 A1    Jun. 21, 2018

(51) Int. Cl.
*G06F 15/173*    (2006.01)
*H04L 12/24*    (2006.01)
*H04L 29/08*    (2006.01)

(52) U.S. Cl.
CPC ........ *H04L 41/0816* (2013.01); *H04L 41/046* (2013.01); *H04L 41/5051* (2013.01); *H04L 41/5087* (2013.01); *H04L 41/5093* (2013.01); *H04L 67/1097* (2013.01); *H04L 67/26* (2013.01); *H04L 67/303* (2013.01); *H04L 67/34* (2013.01); *H04L 67/10* (2013.01)

(58) Field of Classification Search
CPC ... H04L 67/26; H04L 67/303; H04L 67/1097; H04L 41/0816; H04L 41/046
See application file for complete search history.

(56) References Cited

U.S. PATENT DOCUMENTS

| | | |
|---|---|---|
| 9,256,597 B2 | 2/2016 | Li et al. |
| 2013/0054224 A1 | 2/2013 | Jiang et al. |
| 2013/0212212 A1* | 8/2013 | Addepalli ............... G06F 9/461 709/217 |
| 2014/0136952 A1 | 5/2014 | Zhu et al. |
| 2015/0055623 A1* | 2/2015 | Li .......................... H04W 40/04 370/331 |
| 2015/0113157 A1 | 4/2015 | Chan et al. |
| 2015/0120273 A1 | 4/2015 | Gusakov et al. |
| 2015/0249586 A1 | 9/2015 | Byers et al. |
| 2016/0269482 A1* | 9/2016 | Jamjoom ............ H04L 67/1095 |
| 2017/0099212 A1* | 4/2017 | Panagos .............. H04L 67/1097 |
| 2017/0127409 A1* | 5/2017 | Mishra ................... H04W 24/10 |
| 2017/0148098 A1* | 5/2017 | Miale ..................... G06Q 40/06 |

(Continued)

FOREIGN PATENT DOCUMENTS

WO    2011127788    10/2011

OTHER PUBLICATIONS

Verma et al.; "An architecture for Load Balancing Techniques for Fog Computing Environment"; csjournals.com; vol. 6, No. 2; pp. 269-274.*

*Primary Examiner* — Richard G Keehn
(74) *Attorney, Agent, or Firm* — Lieberman & Brandsdorfer, LLC

(57) ABSTRACT

Pre-emptive configuration of a fog computing environment for on-demand services is provided. On-demand services are supported by service modules. Traffic related to demand for service modules is monitored and evaluated. The modules are selectively pushed to and removed from edge servers in a fog computing environment in order to efficiently service the demand for machine translation services.

20 Claims, 9 Drawing Sheets

(56) References Cited

U.S. PATENT DOCUMENTS

| | | | |
|---|---|---|---|
| 2017/0155557 A1* | 6/2017 | Desai | H04L 67/10 |
| 2017/0180487 A1* | 6/2017 | Frank | H04L 67/16 |
| 2017/0272342 A1* | 9/2017 | Zessin | H04L 41/145 |
| 2017/0300693 A1* | 10/2017 | Zhang | H04L 67/06 |
| 2017/0366472 A1* | 12/2017 | Byers | H04L 67/10 |
| 2018/0165579 A1* | 6/2018 | Friel | G06N 3/0445 |
| 2018/0165898 A1* | 6/2018 | Isom | B64C 27/32 |

* cited by examiner

FOG COMPUTING FOR MACHINE TRANSLATION

BACKGROUND

The present embodiments relate to on-demand services in a fog computing environment. More specifically, the embodiments relate to selective pushing and removal of services in the fog computing environment to support real-time service support.

Fog computing is a de-centralized computing infrastructure in which computing resources and application services are logically and efficiently distributed. The goal of fog computing is to reduce data transport to a shared data resource, e.g. cloud based resource, for data processing, analysis and storage. In a fog computing environment, processing takes place local on one or more network connected devices, gateways, and edge server(s). Data is gathered, processed and stored within the network on the edge server(s).

With respect to a network of shared resources, referred to herein as the cloud, the fog computing environment extends computing resources closer to devices that produce and act on the data. Analyzing data on an edge node in the fog computing environment brings the processing in close proximity to the data, thereby minimizing latency. The edge node(s) is connected to the cloud, and as such, processing may take place local to the edge node, or it may be transported to a cloud resource for processing. Designation of processing locations may be based on characteristics associated with the data and time-sensitive requirements, if any. Accordingly, the fog computing configuration provides a processing layer that extends data processing proximal to the origin of the data.

SUMMARY

A system, computer program product, and method are provided to extend the fog computing environment to support real-time machine translation services.

In one aspect, a system is provided with a processing unit in communication with memory, and a functional unit in communication with the processing unit. The functional unit provides on-demand service management in a fog-computing environment with two or more edge servers. The functional tool monitors on-demand services and related traffic. The functional unit statistically evaluates the traffic and the service usage. More specifically, on-demand services employed in the two or more edge servers, and data traffic associated with one or more select services is evaluated. The functional unit identifies an on-demand service module and one of the edges servers to receive the on-demand service module. The functional unit selectively pushes the on-demand service module to the edge server in response to the statistical traffic evaluation and service usage. The on-demand service module provides real-time performance of a task.

In another aspect, a computer program product is provided for on-demand service management in a fog-computing environment with two or more edge servers. The computer program product includes a computer readable storage device with embodied program code that is configured to be executed by a processing unit. More specifically, program code monitors on-demand services and related traffic. Program code statistically evaluates the traffic and the service usage. More specifically, on-demand services employed in the two or more edge servers, and data traffic associated with one or more select services is evaluated. Program code identifies an on-demand service module and one of the edges servers to receive the on-demand service module. Program code selectively pushes the on-demand service module to the edge server in response to the statistical traffic evaluation and service usage. The on-demand service module provides real-time performance of a task In yet another aspect, a method is provided for on-demand service management in a fog-computing environment with two or more edge servers. On-demand services and related traffic is monitored. The traffic and the service usage is statistically evaluated. More specifically, on-demand services employed in the two or more edge servers, and data traffic associated with one or more select services is evaluated. An on-demand service module and one of the edges servers to receive the on-demand service module is identified. The on-demand service module is selectively pushed to the edge server in response to the statistical traffic evaluation and service usage. The on-demand service module provides real-time performance of a task These and other features and advantages will become apparent from the following detailed description of the presently preferred embodiment(s), taken in conjunction with the accompanying drawings.

BRIEF DESCRIPTION OF THE SEVERAL VIEWS OF THE DRAWINGS

The subject matter which is regarded as embodiments is particularly pointed out and distinctly claimed in the claims at the conclusion of the specification. The forgoing and other features, and advantages of the embodiments are apparent from the following detailed description taken in conjunction with the accompanying drawings in which:

DETAILED DESCRIPTION

Figure 1:
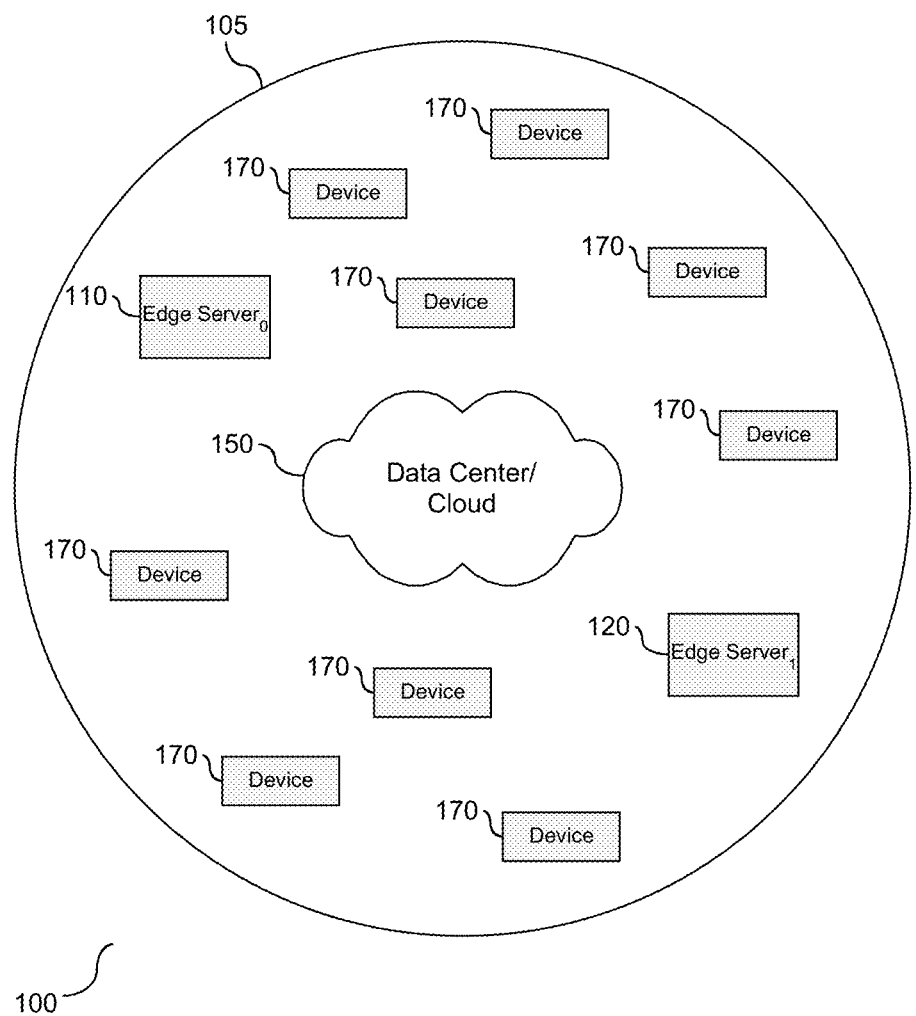
FIG. 1 depicts a block diagram illustrating a fog computing environment and components therein that support use of service modules.

It will be readily understood that the components of the present embodiments, as generally described and illustrated in the Figures herein, may be arranged and designed in a wide variety of different configurations. Thus, the following detailed description of the embodiments of the apparatus, system, and method of the present embodiments, as presented in the Figures, is not intended to limit the scope of the embodiments, as claimed, but is merely representative of selected embodiments.

Reference throughout this specification to "a select embodiment," "one embodiment," or "an embodiment" means that a particular feature, structure, or characteristic described in connection with the embodiment is included in at least one embodiment of the present embodiments. Thus, appearances of the phrases "a select embodiment," "in one embodiment," or "in an embodiment" in various places throughout this specification are not necessarily referring to the same embodiment.

The illustrated embodiments will be best understood by reference to the drawings, wherein like parts are designated by like numerals throughout. The following description is intended only by way of example, and simply illustrates certain selected embodiments of devices, systems, and processes that are consistent with the embodiments as claimed herein.

A system, method and computer program product to pre-emptively configure a fog computing environment for machine learning translation services is provided. Machine learning translation services are supported by machine learning modules. Each module represents a different language and/or a dialect within a specific language. In one embodiment, each module represents a different type of service required such as text translation, voice translation, and/or optical character recognition translation. The modules are maintained on a network configured server and a device, such as a client machine, in communication with the server may utilize a select module for translation support. It is understood that the server and the client machine have limitations with respect to memory and bandwidth, and as such, use of the modules are managed in view of such limitations. At the same time, it is also understood that needs are subject to change, and the selection of modules may be subject to change.

Translation support is shown and described in detail in view of the fog computing environment. By employing translation services in the fog computing environment, translation is delivered locally, thereby alleviating or mitigating issues with respect to bandwidth. More specifically, translation modules are selectively delivered to edge servers, also referred to herein as edge nodes, so that the translation is provided local to the network connected device in need of the translation. The act of supplying a translation module to an edge node is referred to as pushing, and the act of removal of the module is referred to as removing. Accordingly, translation modules are pushed and removed based on the locality of the service demand.

Referring to FIG. 1, a block diagram (100) is provided illustrating a fog computing environment and components therein that support use of translation modules. As shown, the fog computing environment (105) includes multiple edge servers shown herein as edge server$_0$ (110) and edge server$_1$ (120), and network connected devices (170). Data center (150) is shown herein as a network of shared resources, also referred to as a cloud computing environment and is in communication with the fog computing environment (105), also referred to herein as the fog layer. Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics of the cloud model are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 2:
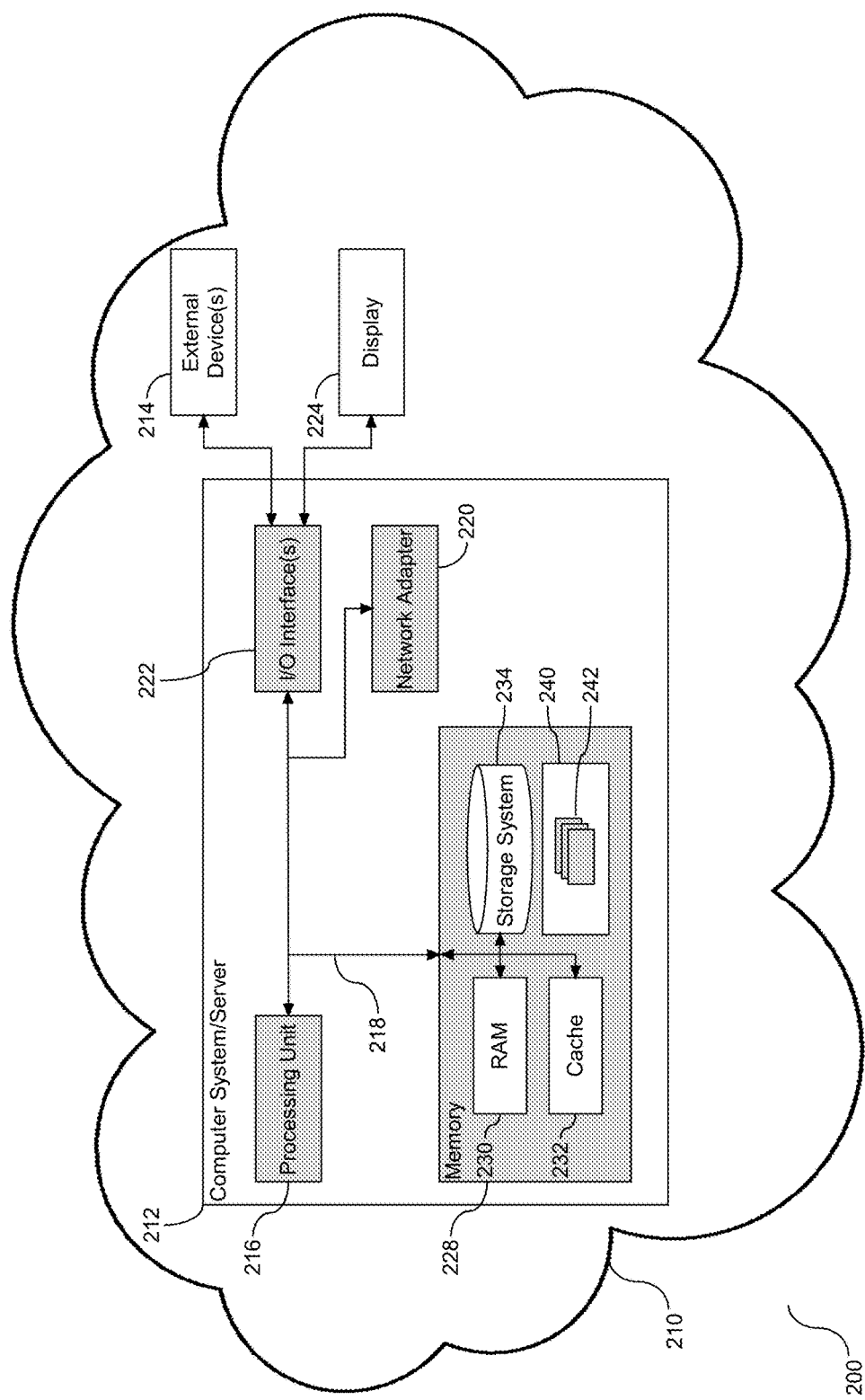
FIG. 2 is a block diagram illustrating an example of a computer system/server of a cloud based support system.

Referring now to FIG. 2, a schematic of an example of a cloud computing node is shown. Cloud computing node (210) is only one example of a suitable cloud computing node and is not intended to suggest any limitation as to the scope of use or functionality of embodiments of the invention described herein. Regardless, cloud computing node (210) is capable of being implemented and/or performing any of the functionality set forth hereinabove.

In cloud computing node (210) there is a computer system/server (212), which is operational with numerous other general purpose or special purpose computing system environments or configurations. Examples of well-known computing systems, environments, and/or configurations that may be suitable for use with computer system/server (212) include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server (212) may be described in the general context of computer system-executable instructions, such as program modules, being executed by a computer system. Generally, program modules may include routines, programs, objects, components, logic, data structures, and so on that perform particular tasks or implement particular abstract data types. Computer system/server (212) may be practiced in distributed cloud computing environments where tasks are performed by remote processing devices that are linked through a communications network. In a distributed cloud computing environment, program modules may be located in both local and remote computer system storage media including memory storage devices.

As shown in FIG. 2, computer system/server (212) in cloud computing node (210) is shown in the form of a general-purpose computing device. The components of computer system/server (212) may include, but are not limited to, one or more processors or processing units (216), system memory (228), and bus (218) that couples various system components including system memory (228) to processor (216).

Bus (218) represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server (212) typically includes a variety of computer system readable media. Such media may be any available media that is accessible by computer system/server (212), and it includes both volatile and non-volatile media, removable and non-removable media.

System memory (228) can include computer system readable media in the form of volatile memory, such as random access memory (RAM) (230) and/or cache memory (232). Computer system/server (212) may further include other removable/non-removable, volatile/non-volatile computer system storage media. By way of example only, storage system (234) can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus (218) by one or more data media interfaces. As will be further depicted and described below, memory (228) may include at least one program product having a set (e.g., at least one) of program modules that are configured to carry out the functions of embodiments of the invention.

Program/utility (240), having a set (at least one) of program modules (242), may be stored in memory (228) by way of example, and not limitation, as well as an operating system, one or more application programs, other program modules, and program data. Each of the operating system, one or more application programs, other program modules, and program data or some combination thereof, may include an implementation of a networking environment. Program modules (242) generally carry out the functions and/or methodologies of embodiments as described herein.

Computer system/server (212) may also communicate with one or more external devices (214) such as a keyboard, a pointing device, a display (224), etc.; one or more devices that enable a user to interact with computer system/server (212); and/or any devices (e.g., network card, modem, etc.) that enable computer system/server (212) to communicate with one or more other computing devices. Such communication can occur via Input/Output (I/O) interfaces (222). Still yet, computer system/server (212) can communicate with one or more networks such as a local area network (LAN), a general wide area network (WAN), and/or a public network (e.g., the Internet) via network adapter (220). As depicted, network adapter (220) communicates with the other components of computer system/server (212) via bus (218). It should be understood that although not shown, other hardware and/or software components could be used in conjunction with computer system/server (212). Examples, include, but are not limited to: microcode, device drivers, redundant processing units, external disk drive arrays, RAID systems, tape drives, and data archival storage systems, etc.

Figure 3:
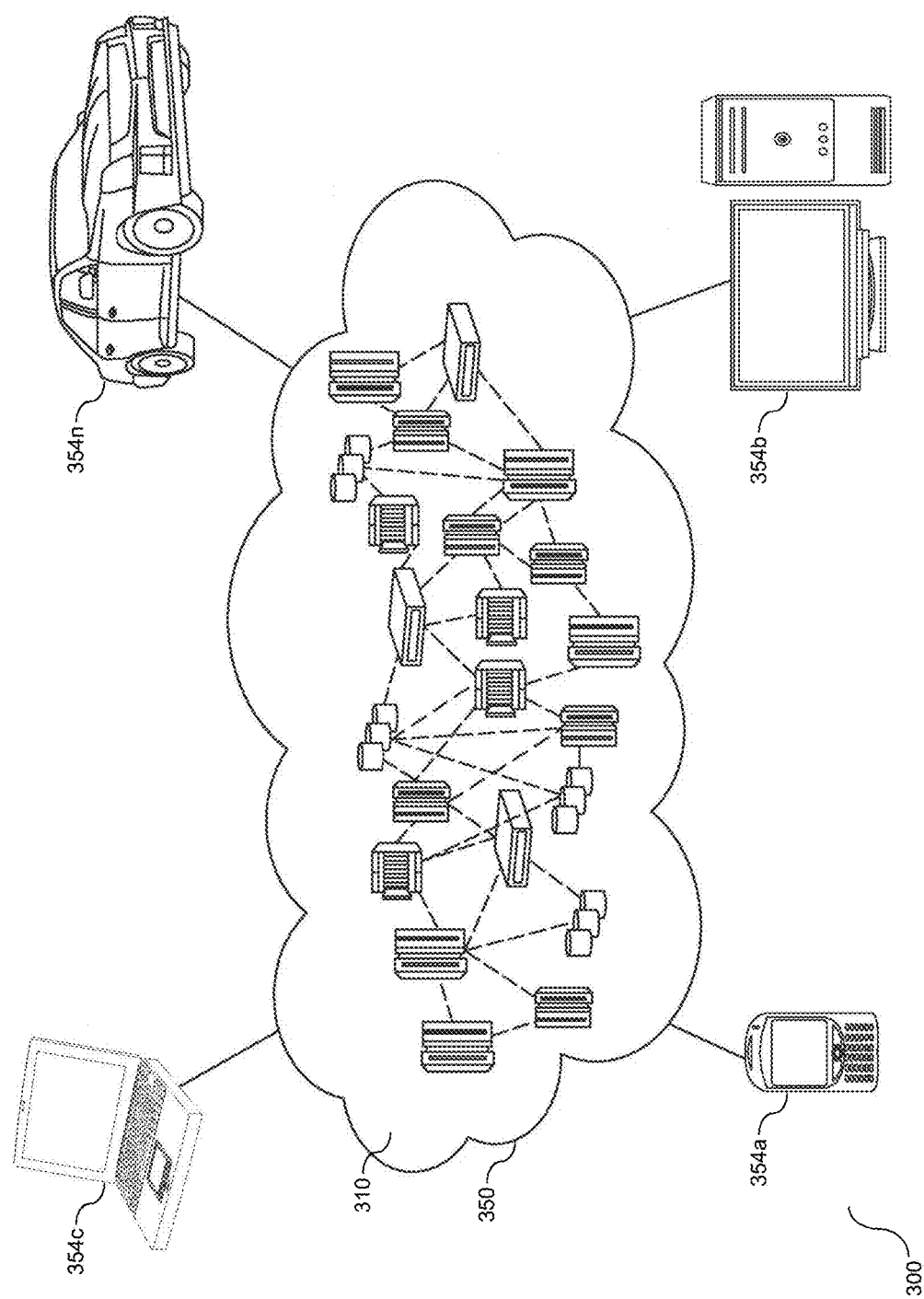
FIG. 3 depicts a block diagram illustrating a cloud computer environment.

Referring now to FIG. 3, illustrative cloud computing environment (350) is depicted. As shown, cloud computing environment (350) comprises one or more cloud computing nodes (310) with which local computing devices used by cloud consumers, such as, for example, personal digital assistant (PDA) or cellular telephone (354a), desktop computer (354*b*), laptop computer (354*c*), and/or automobile computer system (354*n*) may communicate. Nodes (310) may communicate with one another. They may be grouped (not shown) physically or virtually, in one or more networks, such as Private, Community, Public, or Hybrid clouds as described hereinabove, or a combination thereof. This allows cloud computing environment (350) to offer infrastructure, platforms and/or software as services for which a cloud consumer does not need to maintain resources on a local computing device. It is understood that the types of computing devices (354*a-n*) shown in FIG. 3 are intended to be illustrative only and that computing nodes 10 and cloud computing environment (350) can communicate with any type of computerized device over any type of network and/or network addressable connection (e.g., using a web browser).

Figure 4:
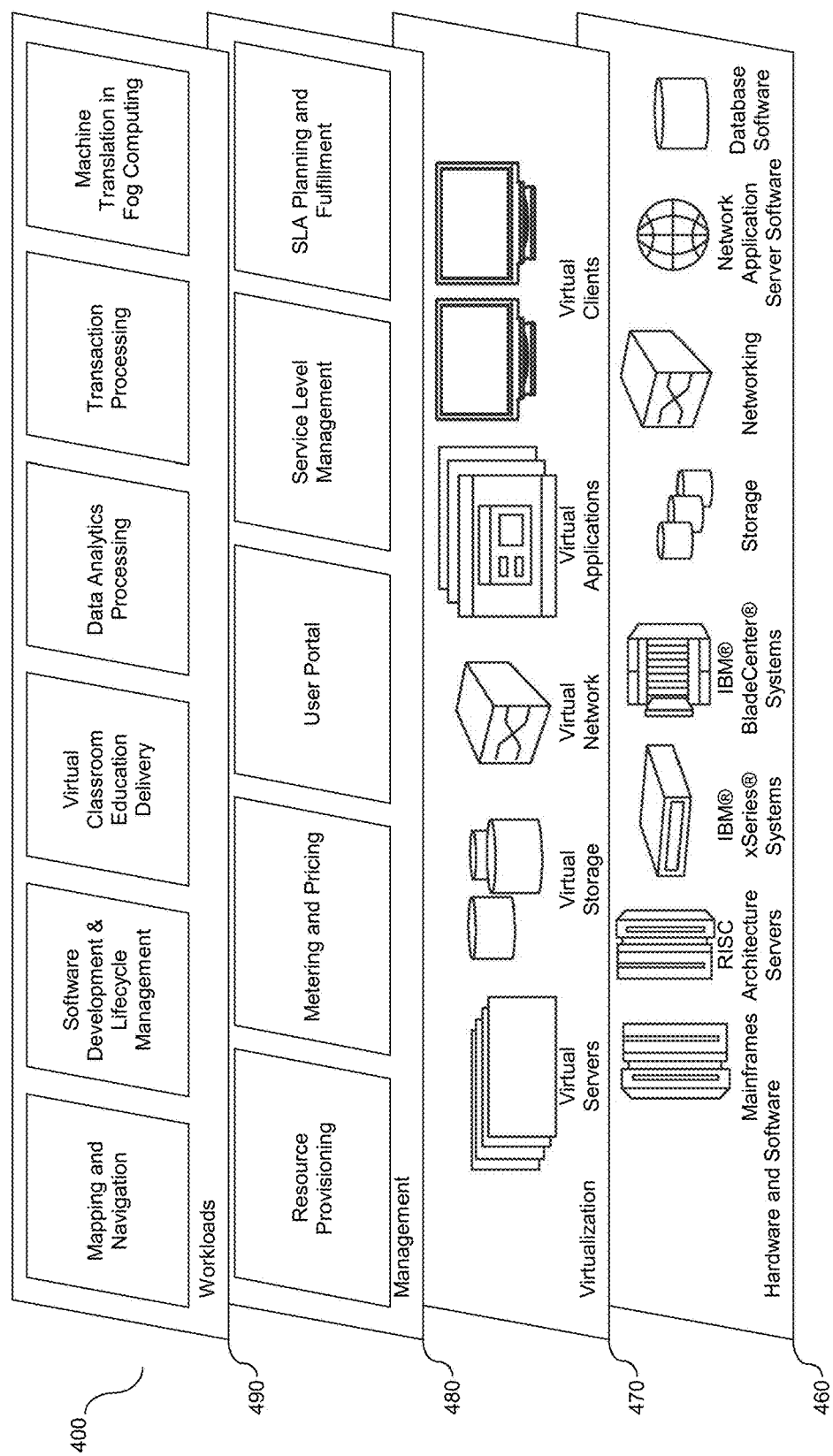
FIG. 4 depicts a block diagram illustrating a set of functional abstraction model layers provided by the cloud computing environment.

Referring now to FIG. 4, a set of functional abstraction layers provided by cloud computing environment (350) (FIG. 3) is shown. It should be understood in advance that the components, layers, and functions shown in FIG. 4 are intended to be illustrative only and embodiments of the invention are not limited thereto. As depicted, the following layers and corresponding functions are provided:

Hardware and software layer (460) includes hardware and software components. Examples of hardware components include: mainframes; RISC (Reduced Instruction Set Computer) architecture based servers; servers; blade servers; storage devices; and networks and networking components. In some embodiments, software components include network application server software and database software.

Virtualization layer (470) provides an abstraction layer from which the following examples of virtual entities may be provided: virtual servers; virtual storage; virtual networks, including virtual private networks; virtual applications and operating systems; and virtual clients In one example, management layer (480) may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer (490) provides examples of functionality for which the cloud computing environment may be utilized. Examples of workloads and functions which may be provided from this layer include: mapping and navigation; software development and lifecycle management; virtual classroom education delivery; data analytics processing; transaction processing; and machine translation in fog computing.

Figure 5:
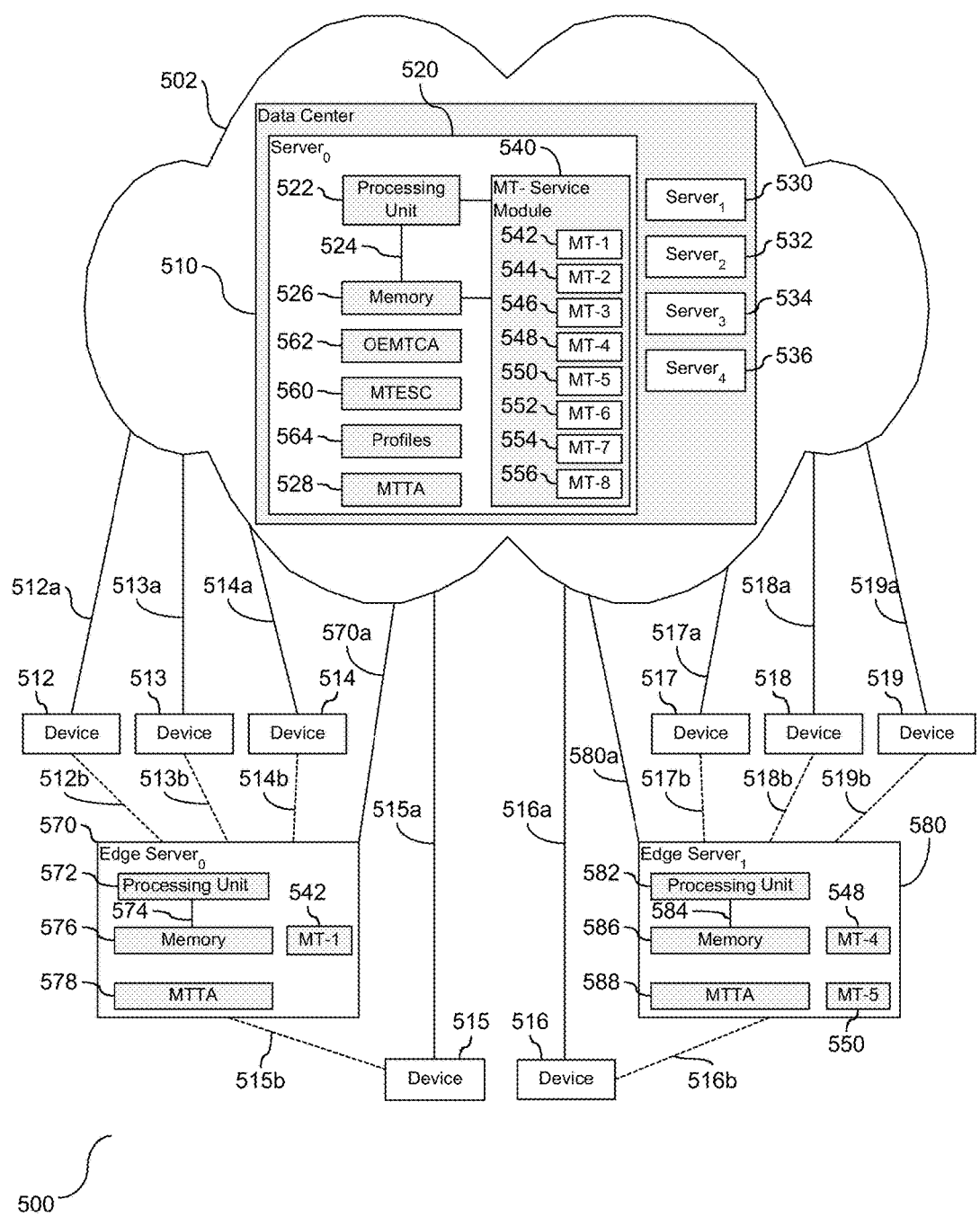
FIG. 5 depicts a block diagram illustrating a data center in communication with a fog computing environment that is in support of dynamic characteristics of application of machine translation modules.

Referring to FIG. 5, a block diagram (500) is provided illustrating a data center in support in communication with a fog computing environment that is in support of the dynamic characteristics of application of the machine translation modules. As shown, a network of shared resources (502) is provided with data center (510). The data center (510) and the resources therein are accessible via a network connection. The data center (510) is shown with a server, shown herein as server$_0$ (520) configured with a processing unit (522) in communication with memory (526) across a bus (524). In one embodiment, data center (510) is provided with a plurality of servers, shown herein as server$_1$ (530), server$_2$ (532), server$_3$ (534), and server$_4$ (536). The quantity of servers provided is for illustration and should not be considered limiting. As shown, server$_0$ (520) is provided with a plurality of functional tools, including a machine translation edge service controller (MTESC) (560), an on-edge machine translation configuration agent (OEMTCA) (562) and in one embodiment, a machine translation traffic analyzer (MTTA) (528). The MTTA (528) monitors machine translation demand in one or more edge servers. For example, the MTTA (528) monitors the number of requests for a machine translation service in one or more edge servers, the source and target languages of the request, the source and target dialects of the request, the service type of the request, data traffic in one or more edge servers, etc. In one embodiment, the functionality of the MTTA (528) is embodied within a plurality of servers. Accordingly, the servers within the network of shared resources monitor machine translation traffic within the fog computing environment and the data center (510).

As shown, server$_0$ (520) is configured with profiles (564) in communication with memory (526). The profiles (564) are a set of online machine translation edge services rules and related settings for servers and/or devices. The rules may be defined by an online machine translation service provider. The profiles (564) may use a weighted edge pushing rule that can be applied to prioritize pushing of demanded machine translation services into the edge server. The profiles (564) can contain user information, such as native language, number of source languages for machine translation service, priority of source languages, preference on fog computing environment, default settings, etc. Accordingly, profiles may be utilized when deciding to change a configuration in the fog computing environment.

The OEMTCA (562) determines the configurations of edge servers based on profiles (564). The OEMTCA (562) receives edge server translation configuration settings and related translation profiles, and, in one embodiment stores the configuration settings as profiles (564). The OEMTCA (562) selectively merges the configuration settings of one or more edge servers into merged configuration settings and selectively merges the related translation profiles of one or more edge servers into merged translation profiles and in one embodiment stores them as profiles (564). The OEMTCA (562) shares configuration settings and translation profiles with servers, edge servers and other devices within the fog computing environment. The MTESC (560) manages edge computing configuration tasks such as pushing translation modules to edge servers and removing machine translation modules from edge servers. In one embodiment, the MTESC (560) provides a graphical user interface for creating and storing edge computing rules. Accordingly, the OEMTCA (562) and the MTESC (560) work in concert to determine and change configurations of edge servers.

A machine translation service module (540) is shown operatively coupled to the processing unit (522) and memory (526). More specifically, module (540) is configured with a plurality of modules (542)-(556). The quantity of modules shown herein is for illustrative purposes, and should not be considered limiting. Each of the modules (542)-(556) is a program or set of instructions that provides a machine translation service between a source language and a target language. In one embodiment, the translation may pertain to a dialect within a specific language. In one embodiment, each module pertains to a particular type of translation service such as text translation, voice translation, and/or optical character recognition translation. The modules (542)-(556) may be individually accessed as a shared resource in the data center (510). Accordingly, one or more servers within the network of shared resources provide modules that support a machine translation service.

With respect to the fog computing environment, access of a select module is directed at pushing the select module to a designated edge server, thereby localizing use of the module. As shown herein, two edge servers, including edge $server_0$ (570) and $server_1$ (580), are in communication with the $server_0$ (520) across one or more network connections (570a) and (580a), respectively. Although only two edge servers are shown, this quantity should not be considered limiting. Edge $server_0$ (570) is shown with memory (576) operatively coupled to a processing unit (572) across a bus (574). In one embodiment, edge $server_0$ (570) is configured with a machine translation traffic analyzer (MTTA) (578) in communication with memory (576) and processing unit (572). Similarly, edge $server_1$ (580) is shown with memory (586) operatively coupled to a processing unit (582) across a bus (584). In one embodiment, edge $server_1$ (580) is configured with a machine translation traffic analyzer (MTTA) (588) in communication with memory (586) and processing unit (582).

Each of the edge servers, edge $server_0$ (570) and edge $server_1$ (580), are in communication with at least one of the machine translation service modules pushed by the MTSEC (560) from the data center (510). The machine translation service modules (542)-(556) may be pushed in response to a configuration setting determined by the OEMTCA (562) or in response to an increase in monitored demand. In one embodiment, the increase in demand is determined by the MTTA (528). As shown herein by way of example, edge $server_0$ (570) is shown with module (542), and edge $server_1$ (580) is shown with modules (548) and (550). Module (542) is pushed to edge $server_0$ (570) by the MTSEC (562) to provide requested or specified machine learning translation in real-time to one or more of the network connected devices having a local connection or proximally positioned with respect to edge $server_0$ (570). Similarly, modules (548) and (550) are shown herein pushed to edge $server_1$ (580) by the MTSEC (562) to provide requested or specified machine learning translation in real-time to one or more network connected devices positioned proximal to edge $server_1$ (580).

As shown, a set of network connected device (512)-(519) are provided in the fog computing environment. The network connected devices may be a client machine, or in one embodiment, may be a tool with a network connection. Regardless of the form of the network connected device, it is an element in the fog computing environment that may be in need of translation services to be supported by one or more machine translation modules via a locally positioned edge server. As shown, each device (512)-(519) is in communication with the network of shared resources (502) across one or more network connections (512a)-(519a) respectively. In one embodiment, each device (512)-(515) is in communication with edge $server_0$ (570) across one or more network connections (512b)-(515b). In one embodiment, each device (516)-(519) is in communication with edge $server_1$ (580) across one or more network connections (516b)-(519b). Accordingly, a plurality of network connected devices is located throughout and in communication with the fog computing environment.

The translation modules shown 'pushed' to the edge servers may also be removed from the respective edge servers. The machine translation service modules (542)-(556) may be removed in response to a configuration setting determined by the OEMTCA (562) or in response to a decrease in monitored demand. In one embodiment, the decrease in demand is determined by the MTTA (528). The act of removal may be based upon a decrease in demand for the translation services by the respective edge server or by a device proximally located to the edge server. Similarly, in one embodiment, the act of removal of one or more select modules from a selected edge server may be based on an increased demand by one or more network connected devices that are positioned proximal to a different edge server. The act of pushing modules to a designated edge server proximal to one or more select devices is to mitigate expenses associated with translation. In one embodiment, the act of pushing a translation module includes copying the module from $server_0$ (520) within data center (510) to the designated edge server. Details related to determination of modules for pushing and removing is described in the flow charts discussed below.

Figure 6:
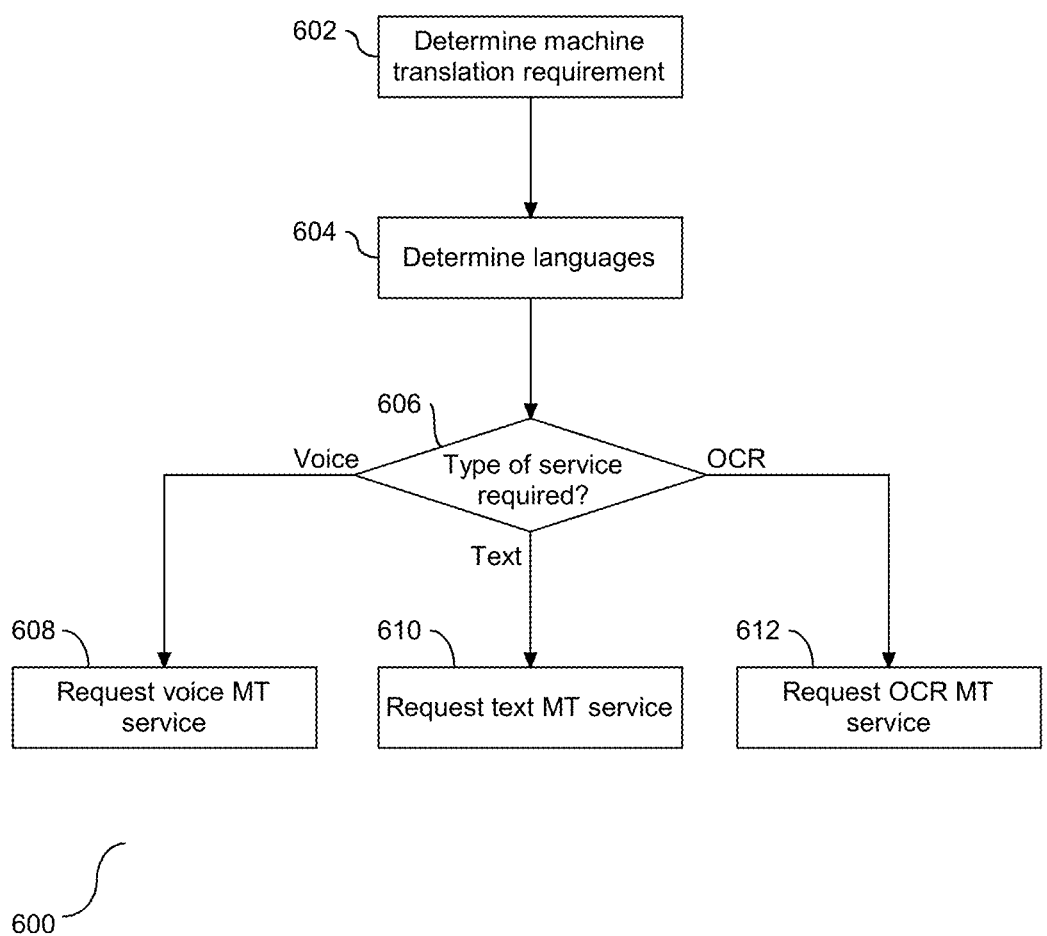
FIG. 6 depicts a flow diagram illustrating generation of requests for machine translation services.

Referring to FIG. 6, a flow diagram (600) is provided to illustrate generations of requests for machine translation services. Network connected devices are elements in the fog computing environment that may be in need of translation services to be supported by one or more machine translation modules via a locally positioned edge server. The network connected devices may proactively indicate the need for translation across a language or dialect, or in one embodiment, the translation demand related to one or more of the clients may be detected (602). Regardless of the form of ascertaining translation demand, the machine translation service requirement is determined at step (602, which is followed by determining the respective languages required to service the demand (604). More specifically, at step (604), both the source language and the target language are determined. In one embodiment, both the source dialect and target dialect are also determined at step (604). It is understood that select modules may provide translation services across select languages. For example, a select module may translate from English as a source language to German as a target language, and a separate module may translate from German as a source language to French as a target language. Similarly, in one embodiment, a single module may provide translation services across English, French and German, with the translation services being uni-directional or bi-directional. Accordingly, the determination of the source and target language may dictate the selection of translation module(s).

Following the determination of languages at step (604), the type of service(s) required to support the translation is determined or designated (606). For example, in one embodiment three types of machine translation service types are available services, including voice, text, and optical character recognition (OCR). If it was determined voice machine translation service is required then voice machine translation service is requested based on the determined languages (608). Similarly, if it was determined text machine translation service is required then text machine translation service is requested based on the determined languages (610). Similarly, if it was determined OCR machine translation service is required then OCR machine translation service is requested based on the determined languages (612). In one embodiment, the service types shown herein may be expanded to include additional or alternative service types, and as such, these example service types should not be considered limiting. At the same time, as demonstrated herein, a machine translation module may be different depending on the service type. For example, a demand for machine translation from English to German may designate a first module for the demand in the form of text, and a second module for demand in the form of voice. Accordingly, the format of the service demand as well as the source and target language designations may yield different modules for selection and pushing to a designated edge server.

Figure 7:
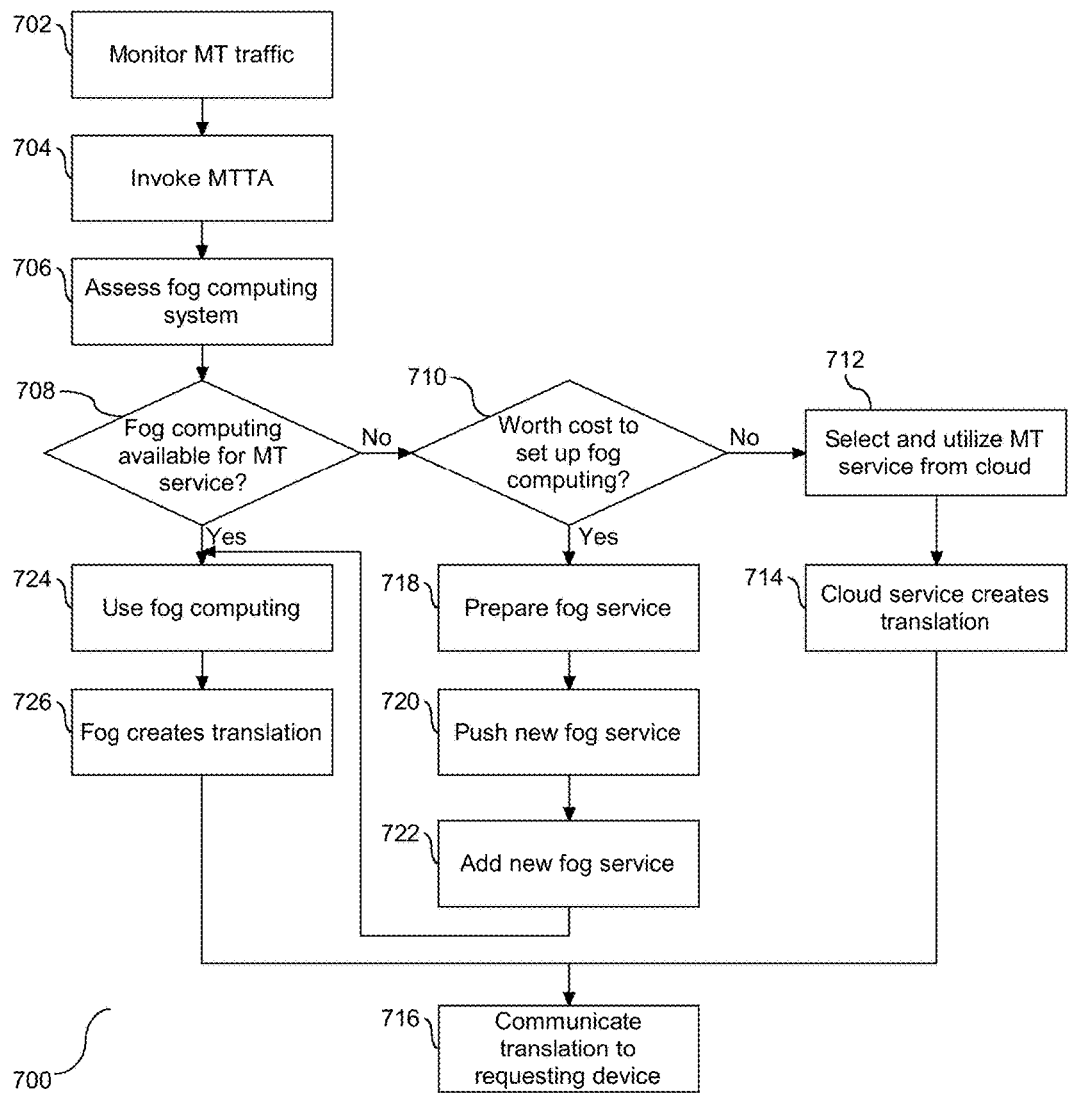
FIG. 7 depicts a flow chart illustrating a process for selectively pushing machine translation modules to one or more edge servers.

Referring to FIG. 7, a flow chart (700) is provided illustrating a process for selectively pushing machine translation modules to one or more edge servers. As shown, machine translation traffic is monitored (702), including, but not limited to, languages, dialects, and translation service type. A machine translation traffic analyzer (MTTA) is invoked to investigate demand and changes in demand for the machine translation(s) and the module(s) utilized to provide the machine translation service (704). It is understood that there is a finite supply of modules, and the demand from network connected devices for the modules is dynamic. As such, the MTTA is employed to investigate the changing environment with respect to supply and demand of the machine translation modules. Accordingly, the machine translation traffic is monitored in a network and subject to further analysis to optimize the placement of one or more select modules within a fog computing environment.

As shown, the MTTA assesses demand for machine translation service modules within the fog computing system including analyzing characteristics with respect to the edge servers in the system and a profile of one or more network connected devices in the system (706). In one embodiment, each edge server has an associated characteristic profile that reflects the limitations of the edge server. For example, the profile may indicate the capacity of the edge server with respect to accommodating and servicing machine translation modules. Similarly, in one embodiment, each client device may have a separate profile that indicates device characteristics, including capacity, bandwidth, recent translation needs, etc. In one embodiment, the network connected device profile is maintained remote from the network connected device, but may be copied and synched to the respective network connected device. Accordingly, the MTTA employs both device and edge server profiles in the fog computing assessment.

Based on assessment and associated feedback from the MTTA, it is determined if fog computing for a demanded machine translation service is available on a select edge server (708). In one embodiment, there is a plurality of edge servers in the fog computing environment. The analysis at step (708) may be for a designated edge server. In one embodiment, the analysis may at step (708) may be expanded for a selection within a set of available edge servers. For example, in one embodiment, the edge servers may be organized into a hierarchical arrangement, or in one embodiment, an ordered list, with the hierarchy varying based on selective importance of server location and capacity. Based on the availability analysis at step (708), an edge server may be identified as available or not available to provide the machine translation service. In one embodiment, the availability of the edge server may be a cost analysis based on factors such as bandwidth, capacity, traffic, customer experience, etc. As such, a negative response to the determination at step (708) is followed by an assessment of the cost to set up and utilize fog computing for the demanded machine translation service with relation to the added benefit of providing the service in the fog computing environment (710). For example, in one embodiment, an available edge server may not be the optimal server for the service. If at step (710) it is determined that the cost is a barrier to delivering the demanded service in the fog computing environment, an online machine translation service is selected and utilized for the demanded service (712), which in one embodiment may be a service available as a cloud based resource. Translation output across the cloud creates a translation (714) that is communicated to an associated network connected device that requested or demanded the translation (716). Accordingly, the cloud environment may be leveraged as a backup or alternative service layer to the fog computing environment for supporting machine translation.

However, a positive response to the determination at step (710) is an indication that the cost is not a barrier for setting up and delivering the machine translation service in the fog computing environment, and preparation for fog based delivery of the service is conducted (718). A selected machine translation module is designated for pushing to one or more edge servers (720) and added as a fog service by pushing (delivering) the selected machine translation module to the designated one or more edge servers (722). It is understood that in the case of the edge server being a non-optimal selection or a less desirable selection there is an inherent expense related to delivering the service. In one embodiment, use of the non-optimal edge server is an indication that the inherent cost of performing the machine translation service in the fog computing environment is less expensive than utilizing a shared resource in the cloud environment for the translation service. Accordingly, the machine translation module is pushed to the fog environment in order to efficiently service machine translations.

Following step (722) or a positive response to the determination at step (708), the requested or demanded machine translation service is utilized on an edge server in the fog computing environment to perform the machine translation service (724). At step (724), the demanded machine translation utilizes the machine translation module pushed to the edge server. In one embodiment, the translation module is copied from a cloud based server to the edge server for delivery of the associated machine translation service from the edge server to the requesting or designated client machine(s). The fog computing environment, by utilizing the edge server, creates a translation (726) that is communicated to an associated client (716), such as a client machine or device that requested or demanded the translation. Accordingly, at least three different options are shown herein for machine translation, with two of the options being in the fog computing layer, and the third option utilizing the cloud computing layer.

Figure 8:
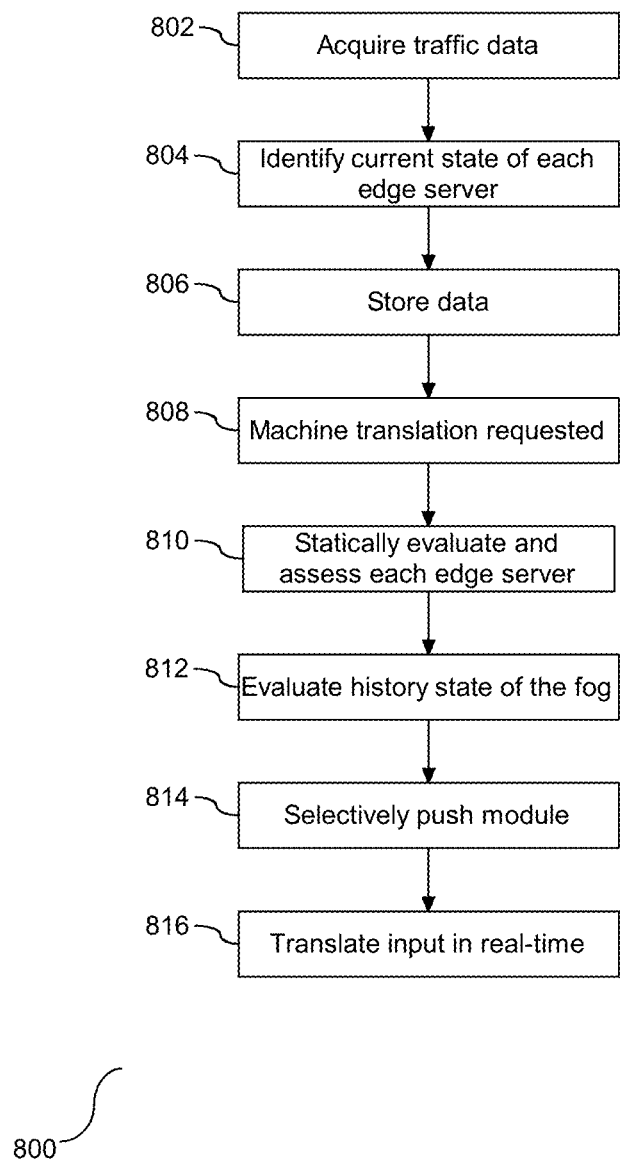
FIG. 8 depicts a flow chart illustrating a process for statistically evaluating traffic data related to machine translation services in the fog computing environment.

As suggested in FIG. 7, selection or designation of an appropriate edge server may be complex. For example, an edge server that is located proximal to the requesting device may be less expensive than a distally positioned edge server with respect to latency. However, the capacity of the edge servers must also be utilized as a factor with respect to expense. If a proximally positioned edge server is available but near capacity, the latency may be increased by utilizing a distal edge server. Referring to FIG. 8, a flow chart (800) is provided illustrating a process for statistically evaluating traffic data related to machine translation services in the fog computing environment. The statistical evaluation of associated traffic data includes both current and historical traffic data. In one embodiment, traffic data is acquired for each of the edge servers at periodic intervals. Examples of change include pushing at least one translation module to one of the edge servers, or removing at least one translation module from one of the edge servers.

At such time as a change in the fog computing environment is detected, traffic data is acquired across each of the identified edge servers, including each edge server that has been directly or indirectly affected by the change, (802). For example, an edge server that has received a machine translation module or an edge server that has had a machine translation module removed has a direct affect from the change. Similarly, a different edge server in the fog is indirectly affected by the change. In one embodiment, traffic data is acquired for each of the edge servers whenever there is a change in the fog computing environment. Accordingly, traffic data is acquired in response to a configuration change in the fog computing environment.

Data pertaining to a current state of each of the edge servers is identified (804). Similarly, the current state data is stored so that it may be employed for historical evaluation of the state of the edge servers and the fog computing environment (806). In one embodiment, maintenance of the state data includes measuring and managing machine translation data usage in each edge server, with the usage data including quantity and type of machine translation services and data traffic for each service type. Accordingly, for each change in translation module allocation in the fog computing environment, data traffic and associated data characteristics in the fog computing environment are acquired.

The state of the fog computing environment and specifically the state of the edge servers in the fog computing environment may be assessed in its current state based on its current state data, as well as in any historic state based on past state data. For example, at such time as a machine translation service may be requested (808), the traffic in the fog computing environment is evaluated (810). This evaluation at step (810) includes a statistical traffic evaluation and assessment of the current state of the fog layer, including the state of the requested or preferably edge server to support the service request. In one embodiment, the evaluation at step (810) includes a statistical evaluation and assessment of each edge server in the fog computing environment. Similarly, the evaluation is extended to include a historical assessment of the state of the fog computing environment (812). In one embodiment, the historical assessment may be particular to the requested translation module(s), whether the request historically includes a subsequent module request, the length of prior request of the same module(s), prior traffic associated with the module and the designated server, etc. Accordingly, the statistical evaluation includes current and past request, subject and ancillary edge servers, and subject and ancillary translation modules, each associated with the selected machine translation services.

Following the evaluation at step (812), a module and edge server, or in one embodiment a selection to employ the cloud layer in place of the fog computing environment, are identified, and the module is selectively pushed to the identified edge server (814). More specifically, the selective pushing incorporates or otherwise utilizes the statistical evaluation at step (810). Machine translation services are provided in real-time to the requesting client machine. More specifically, a received input string in a source language is translated in real-time by the translation module on the designated edge server (816). The selective pushing at step (814) may be reactive based on a current state in the fog computing environment including demand of translation service requests. Similarly, the selective pushing at step (814) may be reactive based on a historical assessment of service requests of the specified machine translation service in the fog computing environment. The selective pushing at step (814) may also be proactive according to client characteristics, such as prediction of a quantity of native language clients.

Figure 9:
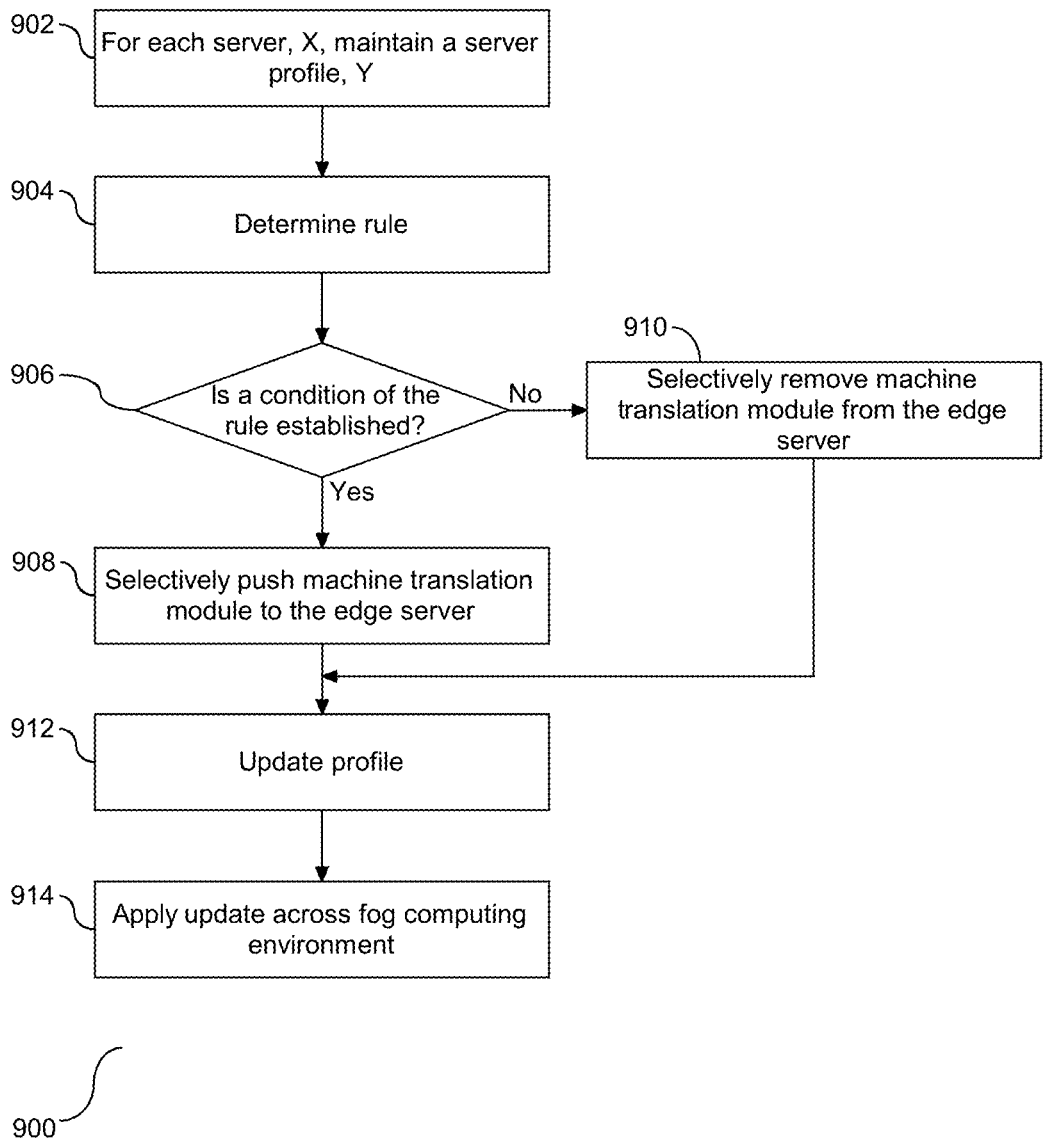
FIG. 9 depicts a flow chart illustrating a process for selecting and removing one or more machine translation modules from an edge server.

It is understood that there a finite quantity of machine translation service modules, a finite quantity of edge servers, and limitations with respect to bandwidth, capacity and traffic. A machine translation module may be selectively pushed to an edge server, and at such time as demand for the service changes, the machine translation module may be selectively removed from the edge server. Referring to FIG. 9, a flow chart (900) is provided illustrating a process for selecting and removing one or more machine translation modules from an edge server. For each edge server, X, an edge server profile, Y, is maintained (902). Each edge server$_X$ profile$_Y$ includes a rule related to the machine translation modules which includes one or more conditions. For example, the rule may include a condition directly related to the quantity of requests received for use of one of the machine translation modules. The rule associated with server$_X$ profile$_Y$ is determined (904). A determination is made of whether the condition of the rule has been established or is not established (906). For a module that has not already been pushed to an edge server, at such a time as the condition of the rule is determined to be established at step (906), the module is selectively pushed to the edge server (908). In one embodiment, the module is selectively pushed to the edge server in response to a minimum quantity of translation requests being met or exceeded. The minimum quantity can be dynamically determined or preset based on a parameter. Similarly, for a module that has already been pushed to an edge server, at such time as the condition of the rule is determined to be no longer established at step (906), the module is selectively removed from the edge server (910). In one embodiment, the module is selectively removed in response to a demand decreasing below a minimum quantity of translation requests.

Whether the determination of the condition is followed by selectively pushing or removal, following either of steps (908) and (910), the profile of the subject edge server is updated (912), and the update is applied across the edge servers in the fog computing environment (914). In one embodiment, the edge server profiles may be merged and shared across the fog computing environment. Similarly, in one embodiment, each machine translation module may have an associated profile, that also may be received, shared, and merged among the edge servers in the fog computing environment. The rule for one or more of the servers may be static, or in one embodiment, the rule for one or more of the edge servers may be dynamic and/or weighted, with the weighting having an increased or decreased effect on the selective pushing or removing of translation modules across the fog computing environment. Accordingly, the machine translation modules are part of a fluid system which can dynamically change configuration in order to align with demand for machine translation service requests.

In this document, the terms "computer program medium," "computer usable medium," and "computer readable medium" are used to generally refer to media such as main memory (228), including RAM (230), cache (232), and storage system (234), such as a removable storage drive and a hard disk installed in a hard disk drive.

Computer programs (also called computer control logic) are stored in memory (228). Computer programs may also be received via a communication interface, such as network adapter (220). Such computer programs, when run, enable the computer system to perform the features of the present embodiments as discussed herein. In particular, the computer programs, when run, enable the processing unit (216) to perform the features of the computer system. Accordingly, such computer programs represent controllers of the computer system.

The present embodiments may be a system, a method, and/or a computer program product. The computer program product may include a computer readable storage medium (or media) having computer readable program instructions thereon for causing a processor to carry out aspects of the present embodiments.

The computer readable storage medium can be a tangible device that can retain and store instructions for use by an instruction execution device. The computer readable storage medium may be, for example, an electronic storage device, a magnetic storage device, an optical storage device, an electromagnetic storage device, a semiconductor storage device, or any suitable combination of the foregoing. A list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

As will be appreciated by one skilled in the art, the aspects may be embodied as a system, method, or computer program product. Accordingly, the aspects may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, the aspects described herein may take the form of a computer program product embodied in one or more computer readable medium(s) having computer readable program code embodied thereon.

A computer readable signal medium includes a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium is any computer readable medium that is not a computer readable storage medium and that can communicate, propagate, or transport a program for use by or in connection with an instruction execution system, apparatus, or device.

The embodiments are described above with reference to flow chart illustrations and/or block diagrams of methods, apparatus (systems), and computer program products. It will be understood that each block of the flow chart illustrations and/or block diagrams, and combinations of blocks in the flow chart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow chart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flow chart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions, which execute on the computer or other programmable apparatus, provide processes for implementing the functions/acts specified in the flow chart and/or block diagram block or blocks.

The flow charts and block diagrams in the Figures illustrate the architecture, functionality, and operation of possible implementations of systems, methods, and computer program products according to various embodiments. In this regard, each block in the flow charts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flow chart illustration(s), and combinations of blocks in the block diagrams and/or flow chart illustration(s), can be implemented by special purpose hardware-based systems that perform the specified functions or acts, or combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The embodiments described herein may be implemented in a system, a method, and/or a computer program product. The computer program product may include a computer readable storage medium (or media) having computer readable program instructions thereon for causing a processor to carry out the embodiments described herein.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmissions, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

The embodiments are described herein with reference to flow chart illustrations and/or block diagrams of methods, apparatus (systems), and computer program products. It will be understood that each block of the flow chart illustrations and/or block diagrams, and combinations of blocks in the flow chart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow chart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flow chart and/or block diagram block or blocks.

It will be appreciated that, although specific embodiments have been described herein for purposes of illustration, various modifications may be made without departing from the spirit and scope of the specific embodiments described herein. Accordingly, the scope of protection is limited only by the following claims and their equivalents.

Aspects of the present embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The corresponding structures, materials, acts, and equivalents of all means or step plus function elements in the claims below are intended to include any structure, material, or act for performing the function in combination with other claimed elements as specifically claimed. The description of the present embodiments has been presented for purposes of illustration and description, but is not intended to be exhaustive or limited to the embodiments in the form disclosed.

Indeed, executable code could be a single instruction, or many instructions, and may even be distributed over several different code segments, among different applications, and across several memory devices. Similarly, operational data may be identified and illustrated herein within the tool, and may be embodied in any suitable form and organized within any suitable type of data structure. The operational data may be collected as a single dataset, or may be distributed over different locations including over different storage devices, and may exist, at least partially, as electronic signals on a system or network.

Furthermore, the described features, structures, or characteristics may be combined in any suitable manner in one or more embodiments. In the following description, numerous specific details are provided, such as examples of agents, to provide a thorough understanding of the disclosed embodiments. One skilled in the relevant art will recognize, however, that the embodiments can be practiced without one or more of the specific details, or with other methods, components, materials, etc. In other instances, well-known structures, materials, or operations are not shown or described in detail to avoid obscuring aspects of the embodiments.

The corresponding structures, materials, acts, and equivalents of all means or step plus function elements in the claims below are intended to include any structure, material, or act for performing the function in combination with other claimed elements as specifically claimed. The description of the present embodiments have been presented for purposes of illustration and description, but is not intended to be exhaustive or limited to the embodiments in the form disclosed. Many modifications and variations will be apparent to those of ordinary skill in the art without departing from the scope and spirit of the embodiments. The embodiment was chosen and described in order to best explain the principles of the embodiments and the practical application, and to enable others of ordinary skill in the art to understand the embodiments for various embodiments with various modifications as are suited to the particular use contemplated. Accordingly, the implementation of machine translation modules to the fog computer layer, and more specifically aspects of selective pushing of the modules across the layer involved dynamic traffic evaluation thereby providing efficient and real-time delivery of translation services to requesting client machines or devices.

It will be appreciated that, although specific embodiments have been described herein for purposes of illustration, various modifications may be made without departing from the spirit and scope of the embodiments. In particular, the modules are not restricted to machine translation services modules. In one embodiment, the service modules may be a part of any modular program, software or application. Accordingly, the scope of protection of these embodiments is limited only by the following claims and their equivalents.

What is claimed is:

1. A computer system comprising:
    a processing unit in communication with a memory; and
    a functional tool in communication with the processing unit and memory for on-demand service management in a fog computing environment with two or more edge servers, the memory comprising instructions to cause the functional tool to:
        monitor on-demand services and related traffic;
        statistically evaluate the traffic and the service usage, the evaluation including on-demand services employed in the two or more edge servers, and data traffic associated with one or more select services;
        perform a cost analysis for delivering at least one on-demand service in the fog computing environment, wherein upon a determination there is not a cost barrier, the at least one on-demand service is delivered in the fog computing environment, and where there is a cost barrier, the at least one on-demand service is delivered online as a cloud based resource;
        identify at least one on-demand service module and one of the two or more edge servers to receive the at least one identified on-demand service module; and
        selectively push the at least one identified on-demand service module to the identified edge server, the identified on-demand service module to perform a task, the selective push in response to the statistical traffic evaluation and service usage, wherein the pushed on-demand service module provides real-time performance of the task.

2. The system of claim 1, further comprising the functional tool to selectively remove one or more on-demand service modules from one of the edge servers in response to the statistical traffic evaluation and service usage.

3. The system of claim 2, further comprising the functional tool to maintain an edge service profile, including a rule defining a minimum quantity of module calls qualifying for the selective push or removal of the on-demand service module to the identified edge server, and apply the profile to the statistical evaluation.

4. The system of claim 3, wherein the rule is weighted rule, and application of the weighted rule includes the functional tool to push a select service to a designated edge server.

5. The system of claim 1, further comprising the functional tool to maintain data usage in each of the two or more edge servers, the usage data including quantity and type of services, and data traffic for each service type.

6. The system of claim 1, further comprising the functional tool to configure a service, including receive, merge, and share edge server configuration settings and profiles.

7. The system of claim 1, wherein at least one of the on-demand service modules are a machine translation service to translate content from a first language to a second language.

8. The system of claim 1, wherein statistically evaluating the traffic includes current and historic traffic.

9. A computer program product for on-demand service management in a fog computing environment with two or more edge servers, the computer program product comprising a computer readable storage device having program code embodied therewith, the program code executable by a processor to:
    monitor on-demand services and related traffic;
    statistically evaluate the traffic and the service usage, the evaluation including on-demand services employed in the two or more edge servers, and data traffic associated with one or more select services;
    perform a cost analysis for delivering at least one on-demand service in the fog computing environment, wherein upon a determination there is not a cost barrier, the at least one on-demand service is delivered in the fog computing environment, and where there is a cost barrier, the at least one on-demand service is delivered online as a cloud based resource;
    identify at least one on-demand service module and one of the two or more edge servers to receive the at least one identified on-demand service module; and
    selectively push the at least one identified on-demand service module to the identified edge server, the identified on-demand service module to perform a task, the selective push in response to the statistical traffic evaluation and service usage, wherein the pushed on-demand service module provides real-time performance of the task.

10. The computer program product of claim 9, further comprising program code to:
    selectively remove one or more on-demand service modules from one of the edge servers in response to the statistical traffic evaluation and the service usage;
    maintain an edge service profile, including a rule defining a minimum quantity of module calls qualifying for the selective push or removal of the on-demand service module to the identified edge server; and
    apply the profile to the statistical evaluation.

11. The computer program product of claim 10, further comprising program code to configure a service, including receive, merge, and share edge server configuration settings and profiles.

12. The computer program product of claim 9, wherein at least one of the on-demand service modules are a machine translation service to translate content from a first language to a second language.

13. A method for on-demand service management in a fog computing environment configured with two or more edge servers comprising:
    monitoring on-demand services and related traffic;

statistically evaluating the traffic and the service usage, the evaluation including on-demand services employed in the two or more edge servers, and data traffic associated with one or more select services;

performing a cost analysis for delivering at least one on-demand service in the fog computing environment, wherein upon a determination there is not a cost barrier, the at least one on-demand service is delivered in the fog computing environment, and where there is a cost barrier, the at least one on-demand service is delivered online as a cloud based resource;

identifying at least one on-demand service module and one of the two or more edge servers to receive at least one identified on-demand service module; and selectively pushing the at least one identified on-demand service module to the identified edge server, the identified on-demand service module to perform a task, the selective pushing in response to the statistical traffic evaluation and service usage, wherein the pushed on-demand service module provides real-time performance of the task.

14. The method of claim 13, further comprising selectively removing one or more one-demand service modules from one of the edge servers in response to the statistical traffic evaluation and the service usage.

15. The method of claim 14, further comprising maintaining an edge service profile, including a rule defining a minimum quantity of module calls qualifying for selectively pushing or removing the on-demand service module to the identified edge server, and applying the profile to the statistical evaluation.

16. The method of claim 15, wherein the rule is a weighted rule, and application of the weighted rule includes pushing a select service to a designated edge server.

17. The method of claim 13, further comprising maintaining data usage in each of the two or more edge servers, the usage data including quantity and type of services, and data traffic for each service type.

18. The method of claim 13, further comprising configuring a service, including receiving, merging, and sharing edge server configuration settings and profiles.

19. The method of claim 13, wherein at least one of the on-demand service modules are a machine translation service to translate content from a first language to a second language.

20. The method of claim 13, wherein statistically evaluating the traffic includes current and historic traffic.

* * * * *